United States Patent
Hu et al.

(10) Patent No.: US 7,616,405 B2
(45) Date of Patent: Nov. 10, 2009

(54) SLIDER WITH AN AIR BEARING SURFACE HAVING A INTER-CAVITY DAM WITH OD AND ID DAM SURFACES OF DIFFERENT HEIGHTS

(75) Inventors: Yong Hu, Fremont, CA (US); Eric T. Sladek, Pleasanton, CA (US); Biao Sun, Fremont, CA (US); Forhad Hossain, Fremont, CA (US); Ji-Feng Ying, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 454 days.

(21) Appl. No.: 11/600,348

(22) Filed: Nov. 15, 2006

(65) Prior Publication Data

US 2008/0112086 A1    May 15, 2008

(51) Int. Cl.
G11B 5/60    (2006.01)
G11B 17/32    (2006.01)
G11B 21/21    (2006.01)
(52) U.S. Cl. .................. 360/236.2; 360/235.5; 360/235
(58) Field of Classification Search .............. 360/235.5, 360/236, 236.2, 236.3, 235
See application file for complete search history.

(56) References Cited

U.S. PATENT DOCUMENTS

| | | | |
|---|---|---|---|
| 5,343,343 A | 8/1994 | Chapin | |
| 5,353,180 A | 10/1994 | Murray | |
| 5,870,250 A | 2/1999 | Bolasna et al. | |
| 5,917,679 A * | 6/1999 | Park et al. | 360/235.6 |
| 5,940,249 A | 8/1999 | Hendriks | |
| 6,021,020 A | 2/2000 | Itoh et al. | |
| 6,055,127 A | 4/2000 | Boutaghou et al. | |
| 6,072,662 A | 6/2000 | Utsunomiya | |
| 6,188,547 B1 | 2/2001 | Gui et al. | |
| 6,212,032 B1 | 4/2001 | Park et al. | |
| 6,445,542 B1 | 9/2002 | Levi et al. | |
| 6,483,667 B1 | 11/2002 | Berg et al. | |
| 6,490,135 B1 | 12/2002 | Sannino et al. | |
| 6,498,701 B1 | 12/2002 | Berg | |
| 6,504,682 B1 | 1/2003 | Sannino et al. | |
| 6,515,831 B1 | 2/2003 | Sannino et al. | |
| 6,594,113 B2 | 7/2003 | Rao et al. | |
| 6,603,639 B1 | 8/2003 | Polycarpou et al. | |
| 6,661,612 B1 | 12/2003 | Peng | |
| 6,690,545 B1 | 2/2004 | Chang et al. | |
| 6,707,631 B1 | 3/2004 | Haddock | |
| 6,747,847 B2 | 6/2004 | Stoebe et al. | |
| 6,785,093 B2 | 8/2004 | Baba et al. | |
| 7,019,945 B1 | 3/2006 | Peng et al. | |

(Continued)

Primary Examiner—Craig A Renner
Assistant Examiner—Tamara Ashford (57) ABSTRACT

A head for use in a magnetic hard disk drive or other information storage device includes a novel ABS. The novel ABS includes an inter-cavity dam that is disposed between at least a portion of a cavity and a trailing pad. The inter-cavity dam is spaced longitudinally from the trailing pad by at least one thirtieth of the slider length. The inter-cavity dam includes an OD dam surface and an ID dam surface, with a slider-bisecting longitudinal plane passing between a majority of the OD dam surface and a majority of the ID dam surface. The OD dam surface is recessed from the first plane by an OD dam recession, and the ID dam surface is recessed from the first plane by an ID dam recession that is not equal to the OD dam recession.

16 Claims, 5 Drawing Sheets

U.S. PATENT DOCUMENTS

| | | |
|---|---|---|
| 7,027,265 B2 | 4/2006 | Koishi |
| 2001/0030834 A1 | 10/2001 | Kohira et al. |
| 2002/0008938 A1 | 1/2002 | Nath et al. |
| 2002/0012199 A1 | 1/2002 | Polycarpou et al. |
| 2002/0030938 A1 | 3/2002 | Boutaghou |
| 2002/0041467 A1 | 4/2002 | Boutaghou et al. |
| 2002/0048120 A1 | 4/2002 | Boutaghou et al. |
| 2002/0051316 A1 | 5/2002 | Boutaghou |
| 2002/0060881 A1 | 5/2002 | Chapin et al. |
| 2002/0071216 A1 | 6/2002 | Sannino et al. |
| 2002/0089789 A1 | 7/2002 | Baba et al. |
| 2002/0109941 A1 | 8/2002 | Chapin et al. |
| 2003/0058578 A1 | 3/2003 | Boutaghou et al. |
| 2003/0067719 A1 | 4/2003 | Boutaghou et al. |
| 2003/0128471 A1 | 7/2003 | Bolasna et al. |
| 2003/0227717 A1 | 12/2003 | Cha et al. |
| 2004/0032694 A1 | 2/2004 | Sun et al. |
| 2004/0100732 A1 | 5/2004 | Deng et al. |
| 2004/0156143 A1 | 8/2004 | Kang |
| 2004/0233580 A1 | 11/2004 | Yao et al. |
| 2004/0240109 A1 | 12/2004 | Hamann et al. |
| 2005/0099728 A1 | 5/2005 | Deng et al. |
| 2005/0105216 A1 | 5/2005 | Ueno et al. |
| 2005/0190500 A1 | 9/2005 | Song |
| 2005/0207065 A1 | 9/2005 | Takagi |
| 2005/0213252 A1 | 9/2005 | Park |
| 2005/0225902 A1 | 10/2005 | Kohira |
| 2006/0023358 A1 | 2/2006 | Huang |
| 2006/0119986 A1 | 6/2006 | Takeuchi et al. |
| 2007/0206326 A1 | 9/2007 | Zhang |

* cited by examiner

SLIDER WITH AN AIR BEARING SURFACE HAVING A INTER-CAVITY DAM WITH OD AND ID DAM SURFACES OF DIFFERENT HEIGHTS

FIELD OF THE INVENTION

The present invention relates generally to the field of information storage devices, and more particularly to air bearing sliders used in such devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

Figure 1:
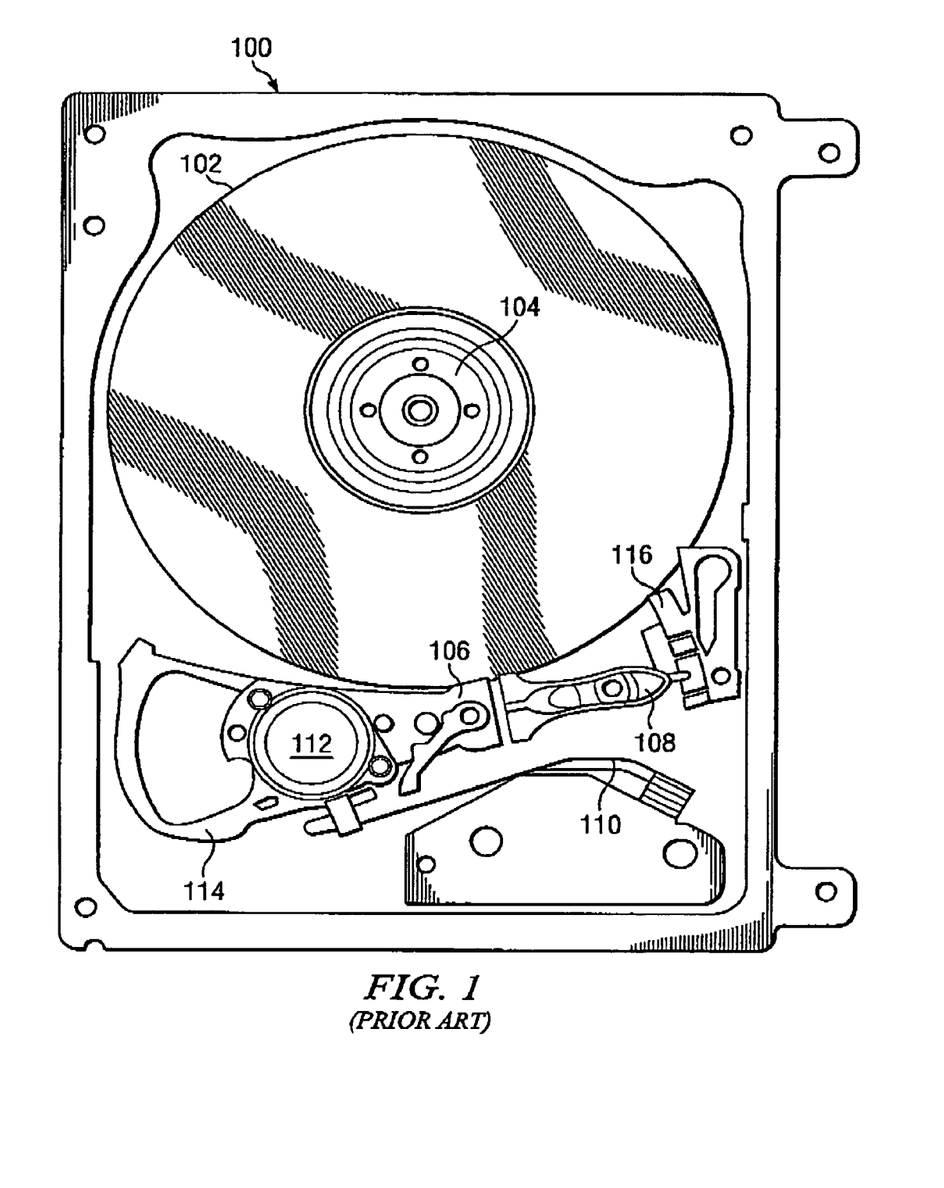
FIG. 1 depicts a contemporary hard disk drive information storage device.

The typical hard disk drive includes a head disk assembly (HDA) and a printed circuit board (PCB) attached to a disk drive base of the HDA. Referring now to FIG. 1, the head disk assembly 100 includes at least one disk 102 (such as a magnetic disk, magneto-optical disk, or optical disk), a spindle motor 104 for rotating the disk, and a head stack assembly (HSA) 106. The spindle motor typically includes a rotating hub on which disks mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host. The head stack assembly 106 typically includes an actuator, at least one head gimbal assembly (HGA) 108 that includes a head, and a flex cable assembly 110.

During operation of the disk drive, the actuator must rotate to position the heads adjacent desired information tracks on the disk. The actuator includes a pivot bearing cartridge 112 to facilitate such rotational positioning. One or more actuator arms extend from the actuator body. An actuator coil 114 is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

In magnetic and optical disk drives, the head typically comprises a body called a "slider" that carries a magnetic transducer and/or focusing lens. Magnetic transducers typically comprise a writer and a read element. A magnetic transducer's writer may be of a longitudinal or perpendicular design, and a magnetic read element may be inductive or magnetoresistive. In a magnetic and optical disk drives, the slider is typically supported in very close proximity to the magnetic disk by a hydrodynamic air bearing. As the motor rotates the disk, the hydrodynamic air bearing is formed between an air bearing surface of the slider of the head, and a surface of the disk. The thickness of the air bearing at an important location on the slider (e.g. the location of the transducer) is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface can not be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable.

One challenge that disk drive engineers face is to maintain the desired nominal flying height nearly constant despite changes in radial positioning of the head. As the radial position of the head changes, the relative velocity of the disk surface due to disk rotation also changes. Specifically, the relative velocity of the disk surface increases with increasing radius, tending to influence the flying height to increase as the slider is radially positioned towards the disk outer diameter. We may refer to this as the "velocity effect" on flying height.

Furthermore, as the radial position of the head changes, the relative direction of incoming air flow changes. Specifically, in disk drives that utilize a rotary actuator (or a linear actuator having a line of action that does not pass through the disk center) the skew of the slider will change as the actuator changes its radial position relative to the disk surface. As the skew of the slider changes, the direction of incoming air flow relative to the slider changes accordingly, tending to change the flying height. We may refer to this as the "skew effect" on flying height.

In the past, disk drive engineers have invented various different methods and/or air bearing features to at least partially cancel the velocity effect on flying height with the skew effect on flying height. For example, engineers have designed disk drives so that the maximum skew will occur at the disk outer diameter (where the disk surface velocity is highest)—partially canceling the two effects. Also for example, so-called Transverse Pressure Contour air bearings have utilized recessed steps along the outer edges of the air bearing side rails to better pressurize the rails when the incoming air flow was significantly skewed.

Air bearing designers have also tried skewing the shape of the trailing pad of certain air bearing designs, and/or one or more pressurizing steps around the trailing pad of certain air bearing designs, to better cancel the skew effect and velocity effect. However the design of the air bearing trailing pad, and/or pressurizing steps adjacent the trailing pad, strongly influences other important flying height sensitivities such as sensitivity to changes in ambient pressure (i.e. altitude sensitivity) and sensitivity to slider or disk crown and camber. These sensitivities strongly depend upon the trailing pad design because the trailing pad typically includes the location where the maximum pressure developed by the air bearing occurs, and the trailing pad is also where the flying height is most important because the trailing pad is typically adjacent the transducer (if any). Therefore it is desirable for engineers to have ample freedom to design the trailing pad, and/or pressurizing steps adjacent the trailing pad, to reduce or practically minimize flying height sensitivity to changes in altitude, crown, and/or camber, rather than being constrained to focus the trailing pad design on canceling the skew effect and velocity effect.

Accordingly, what is needed in the art is an air bearing design feature that enhances cancellation of the disk velocity effect (on flying height) with the skew effect (on flying height), without overly constraining the design of the trailing pad and/or pressurizing steps adjacent the trailing pad.

SUMMARY

A head is disclosed and claimed. The head includes a slider having a trailing face and an air bearing surface. The slider defines a longitudinal plane that bisects the air bearing surface and is approximately orthogonal to both the air bearing surface and the trailing face. The air bearing surface includes at least one leading pad that includes a major surface in a first plane. The air bearing surface includes a cavity adjacent the leading pad. The cavity includes a surface that is recessed from the first plane. The air bearing surface includes a trailing pad adjacent the trailing face of the slider. The trailing pad includes a surface that lies in the first plane. The air bearing surface includes a inter-cavity dam that is disposed between at least a portion of the cavity and the trailing pad. The inter-cavity dam is spaced longitudinally from the trailing pad by at least one thirtieth of the slider length. The inter-cavity dam includes an OD dam surface and an ID dam surface, with the longitudinal plane passing between a majority of the OD dam surface and a majority of the ID dam surface. The OD dam surface is recessed from the first plane by an OD dam recession, and the ID dam surface is recessed from the first plane by an ID dam recession that is not equal to the OD dam recession.

DESCRIPTION OF EXEMPLARY EMBODIMENTS

Figure 2:
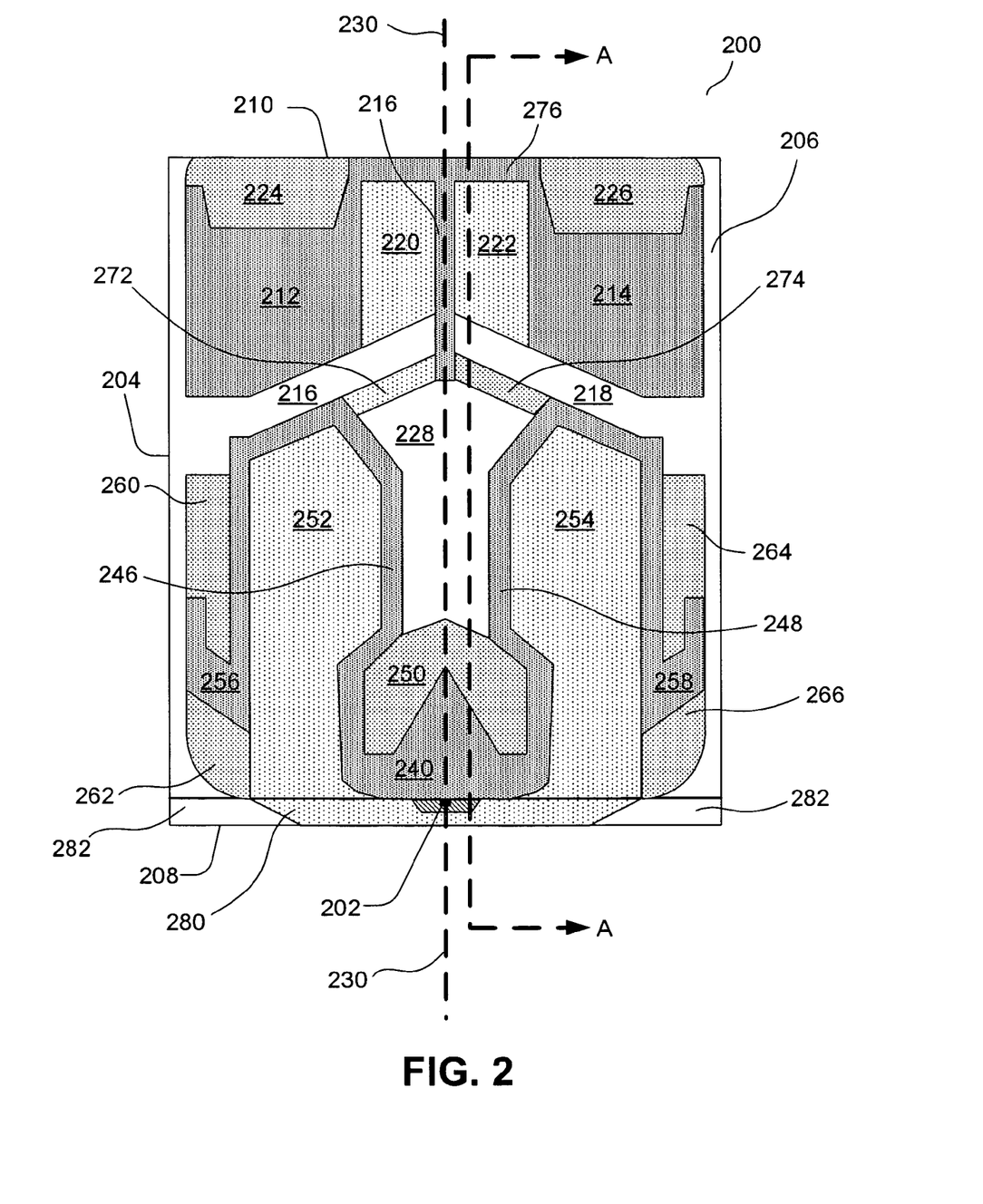
FIG. 2 is an air bearing surface view of a head according to an exemplary embodiment of the present invention (not necessarily to scale).

Referring to FIG. 2, head 200 comprises a transducer 202 for at least reading information from the disk. In certain embodiments, the transducer 202 is a merged thin film magnetic transducer comprising an inductive writer and magneto resistive read element. In such embodiments, the magneto resistive element may be a giant magneto resistive element (GMR) or tunneling magneto resistive element (TMR). In such embodiments, the writer may be a perpendicular magnetic recording (PMR) writer.

Head 200 also comprises a slider 204, which is typically fabricated from a ceramic material such as alumina titanium carbide. Slider 204 includes an air bearing surface 206, which may be formed on the surface of slider 204 by etching or ion milling and has a geometry that may be defined by use of a mask. The slider 204 also includes a trailing face 208, and a leading face 210. The slider 204 defines a longitudinal plane 230 that bisects the air bearing surface 206 and is approximately orthogonal to both the air bearing surface 206 and the trailing face 208. The slider 204 defines a slider length measured along the longitudinal plane 230 from the trailing face 208 to the leading face 210.

Figure 3:
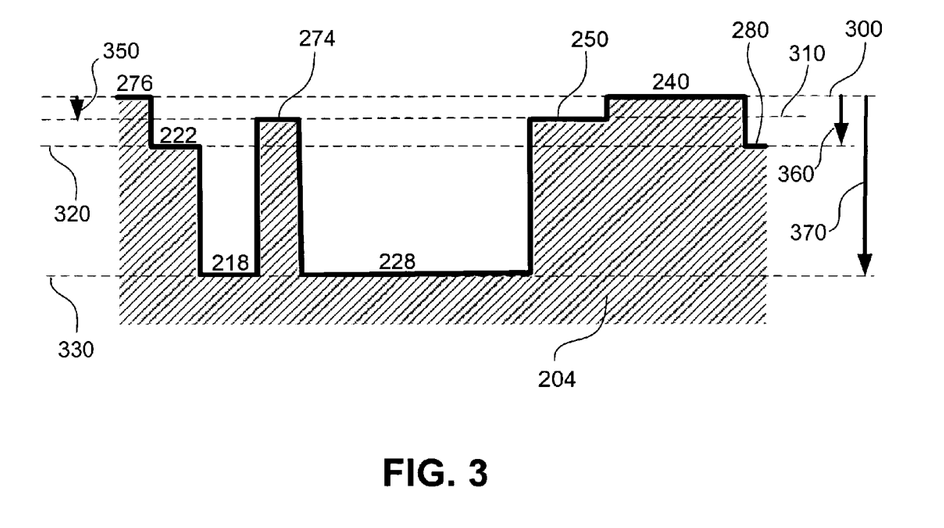
FIG. 3 is cross-sectional view of the head shown in FIG. 2, taken along the plane of cross-section designated as A-A in FIG. 2. For clarity, only the region of the cross-section near the air bearing surface is shown in FIG. 3 and the step heights are not to scale but rather are exaggerated so as to be easily discernible

In the exemplary embodiment shown in FIG. 2 and FIG. 3, the air bearing surface 206 includes forward cavities 216 and 218. In the exemplary embodiment shown in FIG. 2 and FIG. 3, forward cavity 216 includes shallow cavity 220, and forward cavity 218 includes shallow cavity 222. During operation, the shallow cavities 220 and 222 can develop a sub-ambient pressure region between the air bearing surface 206 and the surface of and adjacent disk. The sub-ambient pressure may serve to reduce flying height sensitivity to changes in altitude.

In the exemplary embodiment shown in FIG. 2 and FIG. 3, the air bearing surface 206 also includes two leading pads 212 and 214 that are adjacent to and upstream of the forward cavities 216 and 218, respectively. The term "upstream" is used herein only to define a directional convention to facilitate description of relative positions on the air bearing surface 206, and does not require the presence or existence of any stream. For example, "upstream" can be understood to refer to a range of directions across the air bearing surface 206 that generally point away from the trailing face 208 and towards the leading face 210. As such, in disk drive applications, upstream directions would ultimately be generally opposite the motion of an adjacent rotating disk surface. An upstream direction would be a direction within the aforementioned range. The term "downstream" is used herein as an antonym of "upstream."

The leading pads 212 and 214 each include a major surface that is not recessed and instead establishes an air bearing surface datum plane (hereinafter referred to as the first plane) 300, from which the recession of other surfaces that are parallel to the first plane 300 may be measured. During operation, the leading pads 212 and 214 can develop a super-ambient pressure region between the air bearing surface 206 and the surface of an adjacent disk, causing the slider to assume a positive pitch attitude. Forward cavities 216 and 218 each include a surface in a plane 330 that is recessed from the first plane 300 by a deep cavity recession depth 370. The deep cavity recession depth is preferably but not necessarily in the range 2 microns to 5 microns. Shallow cavities 220 and 222 each include a surface in an intermediate plane 320 that lies between the first plane 300 and the deep cavity plane 330, and that is recessed from the first plane 300 by a shallow cavity recession depth 360. For example, the shallow cavity recession depth 360 is preferably but not necessarily in the range 0.5 microns to 1.5 microns.

In the exemplary embodiment shown in FIG. 2 and FIG. 3, the leading pads 212 and 214 are connected by a leading dam 276 that has a major surface in the first plane 300 and that helps prevent particulate contamination from entering the air bearing and also assists in creating sub-ambient pressure in shallow cavities 220 and 222. The leading pads 212 and 214 also include leading pressurizing steps 224 and 226, respectively. The leading pressurizing steps 224 and 226 each include a surface in a plane 310 that lies between the first plane 300 and the intermediate plane 320. The plane 310 is recessed from the first plane 300 by a pressurizing step recession depth 350. During operation, the leading pressurizing steps 224 and 226 can help develop super-ambient pressure between the leading pads 212 and 214, respectively and the surface of an adjacent disk. The pressurizing step recession depth 350 is preferably but not necessarily in the range 0.1 microns to 0.3 microns.

The air bearing surface 206 includes an inter-cavity dam 272, 274 that is disposed upstream of an aft cavity 228. Inter-cavity dam 272, 274 includes an ID dam surface 272 that is recessed from the first plane 300 by an ID dam recession that is preferably in the range 0.8 microns to 1.5 microns, and an OD dam surface 274 that is recessed from the first plane 300 by an OD dam recession that is preferably in the range 0 microns to 0.3 microns. In the exemplary embodiment shown in FIG. 2 and FIG. 3, ID dam surface 272 lies in the plane 320 and OD dam surface 274 lies in the plane 310. Preferably, the OD dam recession differs from the ID dam recession by at least 0.5 microns but no more than 1.5 microns. However, if the design trends towards smaller disk diameter and higher disk rotational velocity continue in the future, then it is contemplated that the preferred difference between the OD dam recession and the ID dam recession may need to be further reduced (e.g. at least 0.1 microns but no more than 1.5 microns).

The ID dam surface 272 is disposed between at least a portion of forward cavity 216 (which includes shallow cavity 220) and trailing pad 240. The OD dam surface 274 is disposed between at least a portion of forward cavity 218 (which includes shallow cavity 222) and trailing pad 240. The inter-cavity dam 272, 274 is spaced longitudinally from the trailing pad 240 by at least one thirtieth of the slider length, but preferably by one tenth to six tenths of the slider length.

In the exemplary embodiment shown in FIG. 2, the longitudinal plane 230 optionally passes between the entire ID dam surface 272 and the entire OD dam surface 274. However, in certain other embodiments the inter-cavity dam 272, 274 may be laterally shifted (to the left or right in FIG. 2) so that portions of either the ID dam surface 272 or OD dam surface 274 may lie on both sides of the longitudinal plane 230. In such embodiments, the longitudinal plane 230 passes between a majority of the surface area of the ID dam surface 272 and a majority of the surface area of the OD dam surface 274. In certain other embodiments the ID dam surface 272 and the OD dam surface 274 may be of different lengths (rather than being of the same length as shown in FIG. 2), and portions of either the ID dam surface 272 or OD dam surface 274 may lie on both sides of the longitudinal plane 230. In such embodiments, the longitudinal plane 230 passes between a majority of the surface area of the ID dam surface 272 and a majority of the surface area of the OD dam surface 274. In certain other embodiments the boundary between the ID dam surface 272 and the OD dam surface 274 may not be parallel with the longitudinal plane 230 so that portions of both the ID dam surface 272 and the OD dam surface 274 may lie on both sides of the longitudinal plane 230. In such embodiments, the longitudinal plane 230 passes between a majority of the surface area of the ID dam surface 272 and a majority of the surface area of the OD dam surface 274.

The ID dam surface 272 is oriented to confront the skewed incoming air flow when the head is near the inner diameter of the disk, while OD dam surface 274 is oriented to confront the differently-skewed incoming air flow when the head is near the outer diameter of the disk. Because ID dam surface 272 is recessed from the first plane 300 more than OD dam surface 274 is, ID dam surface 272 tends to allow airflow into aft cavity 228 more easily than OD dam surface 274 does. This difference in recession can be used by the air bearing designer to desensitize the flying height to changes in the radial position of the head relative to the spinning underlying disk, given that the incoming air flow has a higher velocity near the outer diameter of the disk and a lower velocity near the inner diameter of the disk. If the air bearing designer advantageously opts to use the inter-cavity dam 272, 274 to desensitize the flying height to changes in the radial position of the head relative to the spinning underlying disk, then the air bearing designer will have more freedom to design downstream features of the air bearing 206, for example to reduce air bearing sensitivity to changes in operating altitude, applied bias forces and torques, and/or crown or camber curvatures of the slider 204.

The two leading pads 212, 214 are separated by shallow cavities 220 and 222, respectively, and shallow cavities 220 and 222 are themselves separated by a longitudinal divider 216. Preferably, the longitudinal divider 216 longitudinally extends from the inter-cavity dam 272,274 towards the leading face 210 for at least one tenth the slider length. In the embodiment shown in FIG. 2, the longitudinal divider 216 longitudinally extends from the inter-cavity dam 272,274 optionally all the way to the leading face 210.

In the exemplary embodiment of FIG. 2 and FIG. 3, the air bearing surface 206 also includes a trailing pad 240 that is not recessed from the first plane 300, and that incorporates a face of transducer 202. During operation, the trailing pad 240 can develop a super-ambient pressure region between the air bearing surface 206 and the surface of an adjacent disk that can help maintain a desired flying height at the location of transducer 202. For example, in the embodiment of FIG. 2 and FIG. 3, the trailing pad 240 creates a region of high pressure, including the highest pressure generated by the air bearing surface during normal operation of the head.

In the embodiment of FIG. 2 and FIG. 3, a pressurizing step surface 250 is disposed adjacent and upstream of the trailing pad 240. The trailing pad step surface 250 is spaced longitudinally from the inter-cavity dam 272, 274 by at least one thirtieth of the slider length. The pressurizing step surface 250 includes a surface that lies in the plane 310. For example, the step surface may be recessed from the first surface 300 by a pressurizing step recession depth 350 in the range 0.1 microns to 0.3 microns.

During operation, the pressurizing step surface 250 can enhance the super-ambient pressure between the trailing pad 240 and the surface of an adjacent disk. Such enhanced pressurization may reduce the surface area required for the trailing pad 240. Moreover, both the aft cavity 228 and the longitudinal plane 230 are disposed between aft cavity side walls 246, 248. Each of the aft cavity side walls 246, 248 includes a surface in the first plane 300 and extends from the trailing pad 240 to (and beyond) the inter-cavity dam 272, 274. The aft cavity side walls 246, 248 can enhance the performance of the pressurizing step surface 250 by partially confining the airflow to pressurize the trailing pad 240.

In certain embodiments, the air bearing surface 206 may also include two shallow side cavities 252 and 254 that are downstream of the forward cavities 216 and 218, respectively. The shallow side cavities 252 and 254 each include a surface in the plane 320. During operation, the shallow side cavities 252 and 254 may develop sub-ambient pressure in much the same way that shallow cavities 220 and 222 do, and thereby shift an effective center of net sub-ambient pressure rearward (towards the trailing face of the slider). Such a shift can facilitate separating the slider from the disk surface dynamically, during operation. The two shallow side cavities 252 and 254 extend rearward to include region 280. Region 280 may include a surface that is recessed from the first plane 300 more than the plane 320 because the two shallow side cavities 252 and 254 are disposed over the main body of the slider 204, which typically comprises the ceramic material alumina titanium carbide, while region 282 which includes region 280 comprises overcoat material which is typically alumina. Alumina typically etches away more rapidly than does alumina titanium carbide during fabrication of the shallow side cavities 252 and 254 and the region 280.

In the embodiment of FIG. 2 and FIG. 3, the air bearing surface 206 also includes side pads 256 and 258, each being laterally spaced from the trailing pad side portions 246 and 248, respectively. The side pads 256 and 258 each include a major surface that lies in the first plane 300. The side pad 256 includes side pressurizing step 260 which includes a surface in plane 310. The side pad 258 includes side pressurizing step 264 which includes a surface in plane 310. Side pads 256 and 258 include trailing side steps 262 and 266, respectively. Trailing side steps 262 and 266 are recessed from the first plane 300 so as to lie in plane 310, to ensure that they do not include the lowest flying height of the air bearing surface 206 despite a potentially non-zero roll angle during operation. It is desired that the lowest flying height of the air bearing surface 206 occur nearer to the transducer 202.

Figure 4:
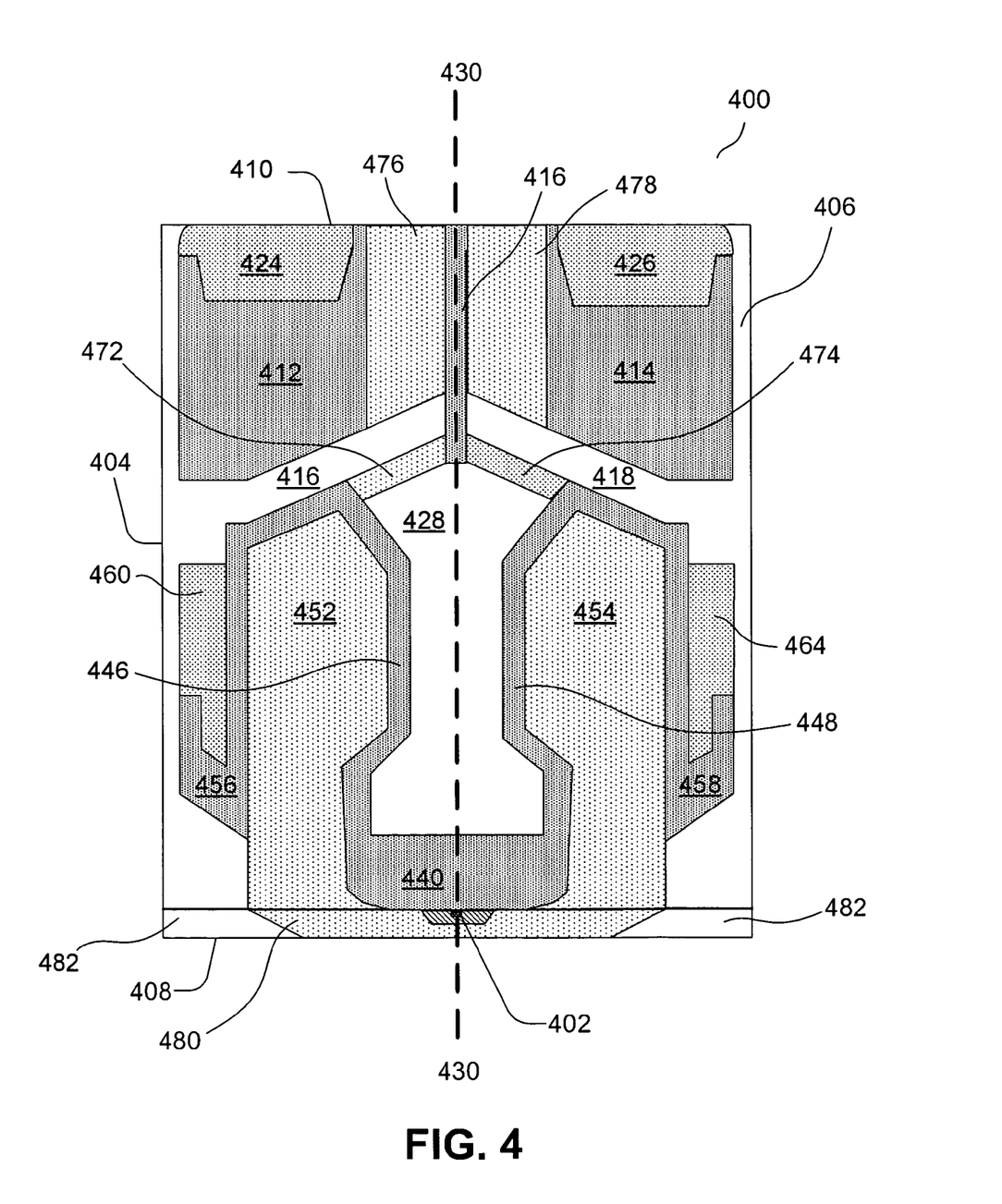
FIG. 4 is an air bearing surface view of a head according to another exemplary embodiment of the present invention (not necessarily to scale).

FIG. 4 depicts a head 400 that includes a transducer 402 and an air bearing surface 406. The slider 404 also includes a trailing face 408, and a leading face 410. The slider 404 defines a longitudinal plane 430 that bisects the air bearing surface 406 and is approximately orthogonal to both the air bearing surface 406 and the trailing face 408. The slider 404 defines a slider length measured along the longitudinal plane 430 from the trailing face 408 to the leading face 410.

In the exemplary embodiment shown in FIG. 4, the air bearing surface 406 includes forward cavities 416 and 418. In the exemplary embodiment shown in FIG. 4, forward cavity 416 includes shallow cavity 476, and forward cavity 418 includes shallow cavity 478. During operation, the shallow cavities 476 and 478 can develop a sub-ambient pressure region between the air bearing surface 406 and the surface of and adjacent disk. The sub-ambient pressure may serve to reduce flying height sensitivity to changes in altitude.

In the exemplary embodiment shown in FIG. 4, the air bearing surface 406 also includes two leading pads 412 and 414 that are adjacent to and upstream of the forward cavities 416 and 418, respectively. The leading pads 412 and 414 each include a major surface that is not recessed and instead establishes an air bearing surface datum plane (hereinafter referred to as the first plane) 300, from which the recession of other surfaces that are parallel to the first plane 300 may be measured. During operation, the leading pads 412 and 414 can develop a super-ambient pressure region between the air bearing surface 406 and the surface of an adjacent disk, causing the slider to assume a positive pitch attitude.

Forward cavities 416 and 418 each include a surface in a plane 330 that is recessed from the first plane 300 by a deep cavity recession depth 370. The deep cavity recession depth is preferably but not necessarily in the range 2 microns to 5 microns. Shallow cavities 476 and 478 each include a surface in an intermediate plane 320 that lies between the first plane 300 and the deep cavity plane 330, and that is recessed from the first plane 300 by a shallow cavity recession depth 360. For example, the shallow cavity recession depth 360 is preferably but not necessarily in the range 0.5 microns to 1.5 microns.

In the exemplary embodiment shown in FIG. 4, the leading pads 412 and 414 include leading pressurizing steps 424 and 426, respectively. The leading pressurizing steps 424 and 426 each include a surface in a plane 310 that lies between the first plane 300 and the intermediate plane 320. The plane 310 is recessed from the first plane 300 by a pressurizing step recession depth 350. During operation, the leading pressurizing steps 424 and 426 can help develop super-ambient pressure between the leading pads 412 and 414, respectively and the surface of an adjacent disk. The pressurizing step recession depth 350 is preferably but not necessarily in the range 0.1 microns to 0.3 microns.

The air bearing surface 406 includes an inter-cavity dam 472, 474 that is disposed upstream of an aft cavity 428. Inter-cavity dam 472, 474 includes an ID dam surface 472 that is recessed from the first plane 300 by an ID dam recession that is preferably in the range 0.8 microns to 1.5 microns, and an OD dam surface 474 that is recessed from the first plane 300 by an OD dam recession that is preferably in the range 0 microns to 0.3 microns. In the exemplary embodiment shown in FIG. 4, ID dam surface 472 lies in the plane 320 and OD dam surface 474 lies in the plane 310. Preferably, the OD dam recession differs from the ID dam recession by at least 0.5 microns but no more than 1.5 microns. However, if the design trends towards smaller disk diameter and higher disk rotational velocity continue in the future, then it is contemplated that the preferred difference between the OD dam recession and the ID dam recession may need to be further reduced (e.g. at least 0.1 microns but no more than 1.5 microns).

The ID dam surface 472 is disposed between at least a portion of forward cavity 416 (which includes shallow cavity 476) and trailing pad 440. The OD dam surface 474 is disposed between at least a portion of forward cavity 418 (which includes shallow cavity 478) and trailing pad 440. The inter-cavity dam 472, 474 is spaced longitudinally from the trailing pad 440 by at least one thirtieth of the slider length, but preferably by one tenth to six tenths of the slider length.

In the exemplary embodiment shown in FIG. 4, the longitudinal plane 430 optionally passes between the entire ID dam surface 472 and the entire OD dam surface 474. However, in certain other embodiments the inter-cavity dam 472, 474 may be laterally shifted (to the left or right in FIG. 4) so that portions of either the ID dam surface 472 or OD dam surface 474 may lie on both sides of the longitudinal plane 430. In such embodiments, the longitudinal plane 430 passes between a majority of the surface area of the ID dam surface 472 and a majority of the surface area of the OD dam surface 474. In certain other embodiments the ID dam surface 472 and the OD dam surface 474 may be of different lengths (rather than being of the same length as shown in FIG. 4), and portions of either the ID dam surface 472 or OD dam surface 474 may lie on both sides of the longitudinal plane 430. In such embodiments, the longitudinal plane 430 passes between a majority of the surface area of the ID dam surface 472 and a majority of the surface area of the OD dam surface 474. In certain other embodiments the boundary between the ID dam surface 472 and the OD dam surface 474 may not be parallel with the longitudinal plane 430 so that portions of both the ID dam surface 472 and the OD dam surface 474 may lie on both sides of the longitudinal plane 430. In such embodiments, the longitudinal plane 430 passes between a majority of the surface area of the ID dam surface 472 and a majority of the surface area of the OD dam surface 474.

The ID dam surface 472 is oriented to confront the skewed incoming air flow when the head is near the inner diameter of the disk, while OD dam surface 474 is oriented to confront the differently-skewed incoming air flow when the head is near the outer diameter of the disk. Because ID dam surface 472 is recessed from the first plane 300 more than OD dam surface 474 is, ID dam surface 472 tends to allow airflow into aft cavity 428 more easily than OD dam surface 474 does. This difference in recession can be used by the air bearing designer to desensitize the flying height to changes in the radial position of the head relative to the spinning underlying disk, given that the incoming air flow has a higher velocity near the outer diameter of the disk and a lower velocity near the inner diameter of the disk. If the air bearing designer advantageously opts to use the inter-cavity dam 472, 474 to desensitize the flying height to changes in the radial position of the head relative to the spinning underlying disk, then the air bearing designer will have more freedom to design downstream features of the air bearing 406, for example to reduce air bearing sensitivity to changes in operating altitude, applied bias forces and torques, and/or crown or camber curvatures of the slider 404.

The two leading pads 412, 414 are separated by shallow cavities 476 and 478, respectively, and shallow cavities 476 and 478 are themselves separated by a longitudinal divider 416. Preferably, the longitudinal divider 416 longitudinally extends from the inter-cavity dam 472,474 towards the leading face 410 for at least one tenth the slider length. In the embodiment shown in FIG. 4, the longitudinal divider 416 longitudinally extends from the inter-cavity dam 472,474 optionally all the way to the leading face 410.

In the exemplary embodiment of FIG. 4, the air bearing surface 406 also includes a trailing pad 440 that is not recessed from the first plane 300, and that incorporates a face of transducer 402. During operation, the trailing pad 440 can develop a super-ambient pressure region between the air bearing surface 406 and the surface of an adjacent disk that can help maintain a desired flying height at the location of transducer 402. For example, in the embodiment of FIG. 4, the trailing pad 440 creates a region of high pressure, including the highest pressure generated by the air bearing surface during normal operation of the head.

Both the aft cavity 428 and the longitudinal plane 430 are disposed between aft cavity side walls 446, 448. Each of the aft cavity side walls 446, 448 includes a surface in the first plane 300 and extends from the trailing pad 440 to (and beyond) the inter-cavity dam 472, 474. The aft cavity side walls 446, 448 can partially confine the airflow to pressurize the trailing pad 440.

In certain embodiments, the air bearing surface 406 may also include two shallow side cavities 452 and 454 that are downstream of the forward cavities 416 and 418, respectively. The shallow side cavities 452 and 454 each include a surface in the plane 320. During operation, the shallow side cavities 452 and 454 may develop sub-ambient pressure in much the same way that shallow cavities 476 and 478 do, and thereby shift an effective center of net sub-ambient pressure rearward (towards the trailing face of the slider). Such a shift can facilitate separating the slider from the disk surface dynamically, during operation. The two shallow side cavities 452 and 454 extend rearward to include region 480. Region 480 may include a surface that is recessed from the first plane 300 more than the plane 320 because the two shallow side cavities 452 and 454 are disposed over the main body of the slider 404, which typically comprises the ceramic material alumina titanium carbide, while region 482 which includes region 480 comprises overcoat material which is typically alumina. Alumina typically etches away more rapidly than does alumina titanium carbide during fabrication of the shallow side cavities 452 and 454 and the region 480.

In the embodiment of FIG. 4, the air bearing surface 406 also includes side pads 456 and 458, each being laterally spaced from the trailing pad side portions 446 and 448, respectively. The side pads 456 and 458 each include a major surface that lies in the first plane 300. The side pad 456 includes side pressurizing step 460 which includes a surface in plane 310. The side pad 458 includes side pressurizing step 464 which includes a surface in plane 310.

Figure 5:
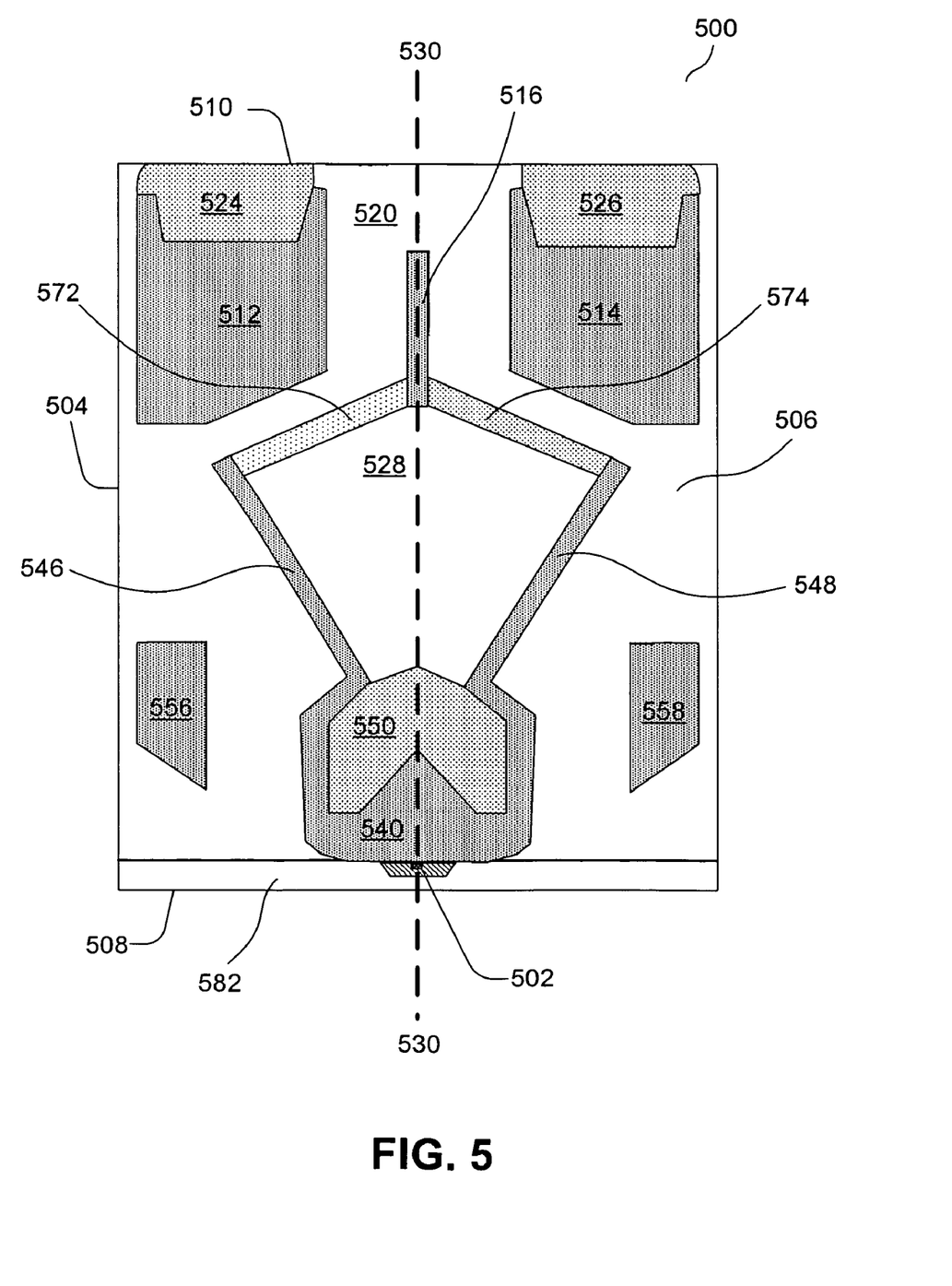
FIG. 5 is an air bearing surface view of a head according to another exemplary embodiment of the present invention (not necessarily to scale).

FIG. 5 depicts head 500 that includes a transducer 502 and an air bearing surface 506. The slider 504 also includes a trailing face 508, and a leading face 510. The slider 504 defines a longitudinal plane 530 that bisects the air bearing surface 506 and is approximately orthogonal to both the air bearing surface 506 and the trailing face 508. The slider 504 defines a slider length measured along the longitudinal plane 530 from the trailing face 508 to the leading face 510.

In the exemplary embodiment shown in FIG. 5, the air bearing surface 506 includes a forward cavity 520 and two leading pads 512 and 514 that are adjacent to and upstream of portions of the forward cavity 520. The leading pads 512 and 514 each include a major surface that is not recessed and instead establishes an air bearing surface datum plane (hereinafter referred to as the first plane) 300, from which the recession of other surfaces that are parallel to the first plane 300 may be measured. During operation, the leading pads 512 and 514 can develop a super-ambient pressure region between the air bearing surface 506 and the surface of an adjacent disk, causing the slider to assume a positive pitch attitude. Forward cavity 520 includes a surface in a plane 330 that is recessed from the first plane 300 by a deep cavity recession depth 370. The deep cavity recession depth is preferably but not necessarily in the range 2 microns to 5 microns.

In the exemplary embodiment shown in FIG. 5, the leading pads 512 and 514 include leading pressurizing steps 524 and 526, respectively. The leading pressurizing steps 524 and 526 each include a surface in a plane 310 that lies between the first plane 300 and an intermediate plane 320 that lies between the first plane 300 and the deep cavity plane 330, and that is recessed from the first plane 300 by a shallow cavity recession depth 360. For example, the shallow cavity recession depth 360 is preferably but not necessarily in the range 0.5 microns to 1.5 microns. The plane 310 is recessed from the first plane 300 by a pressurizing step recession depth 350. During operation, the leading pressurizing steps 524 and 526 can help develop super-ambient pressure between the leading pads 512 and 514, respectively and the surface of an adjacent disk. The pressurizing step recession depth 350 is preferably but not necessarily in the range 0.1 microns to 0.3 microns.

The air bearing surface 506 includes an inter-cavity dam 572, 574 that is disposed upstream of an aft cavity 528. Inter-cavity dam 572, 574 includes an ID dam surface 572 that is recessed from the first plane 300 by an ID dam recession that is preferably in the range 0.8 microns to 1.5 microns, and an OD dam surface 574 that is recessed from the first plane 300 by an OD dam recession that is preferably in the range 0 microns to 0.3 microns. Preferably, the OD dam recession differs from the ID dam recession by at least 0.5 microns but no more than 1.5 microns. However, if the design trends towards smaller disk diameter and higher disk rotational velocity continue in the future, then it is contemplated that the preferred difference between the OD dam recession and the ID dam recession may need to be further reduced (e.g. at least 0.1 microns but no more than 1.5 microns).

The inter-cavity dam 572, 574 is disposed between the forward cavity 520 and the trailing pad 540. The inter-cavity dam 572, 574 is spaced longitudinally from the trailing pad 540 by at least one thirtieth of the slider length, but preferably by one tenth to six tenths of the slider length.

In the exemplary embodiment shown in FIG. 5, the longitudinal plane 530 optionally passes between the entire ID dam surface 572 and the entire OD dam surface 574. However, in certain other embodiments the inter-cavity dam 572, 574 may be laterally shifted (to the left or right in FIG. 5) so that portions of either the ID dam surface 572 or OD dam surface 574 may lie on both sides of the longitudinal plane 530. In such embodiments, the longitudinal plane 530 passes between a majority of the surface area of the ID dam surface 572 and a majority of the surface area of the OD dam surface 574. In certain other embodiments the ID dam surface 572 and the OD dam surface 574 may be of different lengths (rather than being of the same length as shown in FIG. 5), and portions of either the ID dam surface 572 or OD dam surface 574 may lie on both sides of the longitudinal plane 530. In such embodiments, the longitudinal plane 530 passes between a majority of the surface area of the ID dam surface 572 and a majority of the surface area of the OD dam surface 574. In certain other embodiments the boundary between the ID dam surface 572 and the OD dam surface 574 may not be parallel with the longitudinal plane 530 so that portions of both the ID dam surface 572 and the OD dam surface 574 may lie on both sides of the longitudinal plane 530. In such embodiments, the longitudinal plane 530 passes between a majority of the surface area of the ID dam surface 572 and a majority of the surface area of the OD dam surface 574.

The ID dam surface 572 is oriented to confront the skewed incoming air flow when the head is near the inner diameter of the disk, while OD dam surface 574 is oriented to confront the differently-skewed incoming air flow when the head is near the outer diameter of the disk. Because ID dam surface 572 is recessed from the first plane 300 more than OD dam surface 574 is, ID dam surface 572 tends to allow airflow into aft cavity 528 more easily than OD dam surface 574 does. This difference in recession can be used by the air bearing designer to desensitize the flying height to changes in the radial position of the head relative to the spinning underlying disk, given that the incoming air flow has a higher velocity near the outer diameter of the disk and a lower velocity near the inner diameter of the disk. If the air bearing designer advantageously opts to use the inter-cavity dam 572, 574 to desensitize the flying height to changes in the radial position of the head relative to the spinning underlying disk, then the air bearing designer will have more freedom to design downstream features of the air bearing 506, for example to reduce air bearing sensitivity to changes in operating altitude, applied bias forces and torques, and/or crown or camber curvatures of the slider 504.

The two leading pads 512, 514 are separated by a portion of forward cavity 520 and by a longitudinal divider 516. Preferably, the longitudinal divider 516 longitudinally extends from the inter-cavity dam 572,574 towards the leading face 510 for at least one tenth the slider length. In the embodiment shown in FIG. 5, the longitudinal divider 516 longitudinally extends from the inter-cavity dam 572, 574 towards (but does not reach) the leading face 510.

In the exemplary embodiment of FIG. 5 and FIG. 3, the air bearing surface 506 also includes a trailing pad 540 that is not recessed from the first plane 300, and that incorporates a face of transducer 502. During operation, the trailing pad 540 can develop a super-ambient pressure region between the air bearing surface 506 and the surface of an adjacent disk that can help maintain a desired flying height at the location of transducer 502. For example, in the embodiment of FIG. 5 and FIG. 3, the trailing pad 540 creates a region of high pressure, including the highest pressure generated by the air bearing surface during normal operation of the head.

In the embodiment of FIG. 5, a pressurizing step surface 550 is disposed adjacent and upstream of the trailing pad 540. The trailing pad step surface 550 is spaced longitudinally from the inter-cavity dam 572, 574 by at least one thirtieth of the slider length. The pressurizing step surface 550 includes a surface that lies in the plane 310. For example, the step surface may be recessed from the first surface 300 by a pressurizing step recession depth 350 in the range 0.1 microns to 0.3 microns.

During operation, the pressurizing step surface 550 can enhance the super-ambient pressure between the trailing pad 540 and the surface of an adjacent disk. Such enhanced pressurization may reduce the surface area required for the trailing pad 540. Moreover, both the aft cavity 528 and the longitudinal plane 530 are disposed between aft cavity side walls 546, 548. Each of the aft cavity side walls 546, 548 includes a surface in the first plane 300 and extends from the trailing pad 540 to (and beyond) the inter-cavity dam 572, 574. The aft cavity side walls 546, 548 can enhance the performance of the pressurizing step surface 550 by partially confining the airflow to pressurize the trailing pad 540.

In the embodiment of FIG. 5 and FIG. 3, the air bearing surface 506 also includes side pads 556 and 558, each being laterally spaced from the trailing pad side portions 546 and 548, respectively. The air bearing surface 506 also includes a trailing edge region 582 which comprises an overcoat material which is typically alumina.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A head comprising:
   a slider having a leading face and a trailing face and an air bearing surface, the slider defining a longitudinal plane that bisects the air bearing surface and is approximately orthogonal to both the air bearing surface and the trailing face, the slider defining a slider length measured along the longitudinal plane from the trailing face to the leading face, the air bearing surface including:
   at least one leading pad that includes a major surface in a first plane;
   a cavity adjacent the leading pad, the cavity including a surface that is recessed from the first plane;
   a trailing pad adjacent the trailing face, the trailing pad including a surface that lies in the first plane;
   a inter-cavity dam disposed between at least a portion of the cavity and the trailing pad, the inter-cavity dam spaced longitudinally from the trailing pad by at least one thirtieth of the slider length, the inter-cavity dam including an OD dam surface and an ID dam surface, the longitudinal plane passing between a majority of the OD dam surface and a majority of the ID dam surface, the OD dam surface being recessed from the first plane by an OD dam recession, and the ID dam surface being recessed from the first plane by an ID dam recession not equal to the OD dam recession.

2. The head of claim 1 further comprising a read transducer deposited on the trailing face.

3. The head of claim 1 further including a trailing pad step surface adjacent the trailing pad but spaced longitudinally from the inter-cavity dam by at least one thirtieth of the slider length, the trailing pad step surface being recessed from the first surface by a step depth in the range 0.1 microns to 0.3 microns.

4. The head of claim 1 wherein the OD dam recession differs from the ID dam recession by at least 0.5 microns but no more than 1.5 microns.

5. The head of claim 1 wherein the OD dam recession is in the range 0 microns to 0.3 microns.

6. The head of claim 1 wherein the ID dam recession is in the range 0.8 microns to 1.5 microns.

7. The head of claim 1 wherein the surface of the cavity is recessed from the first plane by a depth of 2 microns to 5 microns.

8. The head of claim 1 wherein the cavity comprises a forward portion and an aft portion, the aft portion of the cavity being disposed between the trailing pad and the inter-cavity dam, and the forward portion of the cavity being disposed between the leading face and the inter-cavity dam.

9. The head of claim 8 wherein both the aft portion and the longitudinal plane are disposed between aft cavity side walls, each of the aft cavity side walls including a surface in the first plane.

10. The head of claim 9 wherein each of the aft cavity side walls extends from the trailing pad to the inter-cavity dam.

11. The head of claim 10 wherein the aft cavity side walls extend to and beyond the inter-cavity dam.

12. The head of claim 1 wherein the inter-cavity dam is spaced longitudinally from the trailing pad by one tenth to six tenths of the slider length.

13. The head of claim 1 further comprising a longitudinal divider that extends from the inter-cavity dam towards the leading face along the longitudinal plane, and the longitudinal divider includes a major surface in the first plane.

14. The head of claim 13 wherein the longitudinal divider longitudinally extends from the inter-cavity dam towards the leading face for at least one tenth the slider length.

15. The head of claim 14 wherein the longitudinal divider does not longitudinally extend all the way to the leading face.

16. A head for use in a disk drive, the disk drive including a disk that can rotate to create a direction of disk surface motion, the head comprising:
    a slider having a trailing face and an air bearing surface, the slider defining a longitudinal plane that bisects the air bearing surface and is approximately orthogonal to both the air bearing surface and the trailing face, the air bearing surface including:
        a leading pad including a major surface in a first plane;
        a cavity adjacent the leading pad, the cavity including a surface that is recessed from the first plane;
        a trailing pad adjacent the trailing face, the trailing pad including a surface that lies in the first plane; and
        a means for changing the amount of air allowed to flow from the cavity to the trailing pad depending upon a skew angle between the longitudinal plane and the direction of disk surface motion.

\* \* \* \* \*